Feb. 11, 1964  O. R. CARPENTER  3,120,869
FURNACE WALL OF SPACED TUBES WELDED TO CONTOURED PLATE
Filed May 15, 1958  2 Sheets-Sheet 1

INVENTOR.
Otis R. Carpenter
BY
ATTORNEY

United States Patent Office 3,120,869
Patented Feb. 11, 1964

3,120,869
FURNACE WALL OF SPACED TUBES WELDED TO CONTOURED PLATE
Otis R. Carpenter, Barberton, Ohio, assignor to The Babcock & Wilcox Company, New York, N.Y., a corporation of New Jersey
Filed May 15, 1958, Ser. No. 735,437
6 Claims. (Cl. 165—171)

This invention relates to integrated multiple tube heat exchanger panels and, more particularly, to improved panels of this type comprising a backing plate formed with parallel, arcuate cross-section grooves in one surface and tubes contiguously nested in the grooves and fusion welded to the backing plate.

In the construction and erection of modern vapor generators and other forms of heat exchangers, there is a pronounced trend toward the use of pre-fabricated integral tube panels. As these panels are fabricated in the shop, shipped to the erection site as a unit, and erected as a unit, there is a very considerable saving in fabrication and erection costs as compared to the known practice of shipping individual tubes to the erection site and then assembling these tubes into a tube wall.

As hitherto constructed, panels or panel walls of this type have comprised a plurality of laterally spaced, parallel, and relatively elongated metal tubes united into an integral panel by relatively elongated metal ligaments or webs interconnecting adjacent tubes and fused or welded thereto.

An advantage of ship fabrication of the panels is that the welded joints can be made by the usual automatic or semi-automatic welding equipment and with the tubes in the best position for satisfactory welding. Additionally, the welds can be more readily inspected and correction of defects is facilitated. Readily available shop equipment may be used for inspection, stress-relieving, and other necessary operations. All this is in contrast to the difficulties and expense involved in field welding, inspection, defect correction, stress-relieving, and assembling of tubes into walls.

However, there are some problems incidental to weld uniting the tubes into an integral panel. The principal problem is that of heat induced distortion tending to warp or bend the tubes and thus distort the panel. Prevention or control of such distortion requires special provisions as to tube clamping and welding sequences which seriously increase the cost of production operation. These problems, which are more pronounced with the electric arc fusion welding techniques generally used for panel fabrication, have to some extent mitigated the advantages of shop fabrication.

When such panels are fabricated of tubes interconnected by spacer strips or webs, it is necessary to provide jigs for positioning all the panel elements (tubes and webs) in proper relation before starting the panel welding sequence. In order to obtain the proper final dimensions of the panel, which dimensions are of the greatest importance in facilitating assembly of the panels into the heat exchanger, it is necessary to precisely position the tubes and webs in a predetermined relation before welding, this precise positioning taking into account relative expansion and contraction of the panel elements during welding. All of this increases not only the time and labor expense in making the panel, but also the capital expense for special jigs and supports.

In accordance with the present invention, the aforementioned jigging and alignment apparatus and costs are substantially, if not completely, eliminated by forming the panel of a continuous backing plate having the tubes positioned in parallel, arcuate cross-section grooves extending along the plate and joined to the plate by fusion welds.

Over at least a substantial portion of the arcuate lateral extent, the grooves are formed to a radius equal to the outer radius of the tubes, so that the tubes have a nesting contiguous relation with the surfaces of the grooves. In addition, the grooves have a center-to-center spacing equal to the desired final center-to-center spacing of the tubes. Consequently, proper positioning and aligning of the tubes for welding into a panel is effected substantially automatically by positioning the tubes in and along the grooves of the plate. The fusion welding may be effected immediately subsequent to such positioning without further attention to positioning the tubes in proper center-to-center relation, provision being made to hold each tube firmly in its groove as the tube is fusion welded to the plate.

In a presently preferred embodiment of the invention, a flat plate is formed with parallel, arcuate cross-section grooves by grinding or machining one surface of the plate, the grooves having a radius equal to the outer radius of the tubes, a depth equal to substantially one-half the plate thickness, and a center-to-center spacing equal to the desired final center-to-center spacing of the tubes. Each tube is then joined to the plate by a pair of fusion fillet welds each formed in a fillet between the flat surface of the plate between the grooves and the adjacent outer wall of the tube.

Alternatively, the backing plate may be sinuously corrugated to provide the grooves, with each tube again joined to the plate by a pair of fusion fillet welds.

As another alternative, the backing plate may be corrugated to provide substantially semi-cylindrical grooves receiving the tubes and relatively narrow transition sections substantially tangent to the common diametric or axial plane through the tubes. In this embodiment, fusion welds are formed between each pair of adjacent tubes and the section therebetween, and are continuous over the width of the section.

The welds are preferably formed by fusible metal granular flux submerged electric arc welding. While any submerged arc welding system may be used in forming the panel, a particularly advantageous arc welding arrangement for this panel wall welding is the twin electrode arc welding arrangement illustrated and described in the copending application of F. W. Armstrong, Serial No. 701,809, filed December 10, 1957, now Patent No. 2,911,517 granted November 3, 1959. By virtue of forming two or more welds simultaneously with a negligible ground or return current flow, the mentioned welding arrangement greatly reduces or eliminates any tendency of the tubes to distort laterally of the panel, thus augmenting the lateral restraining function of the grooves in the plate.

For an understanding of the invention priciples, reference is made to the following description of typical embodiments thereof as illustrated in the accompanying drawings. In the drawings.

Figure 1:
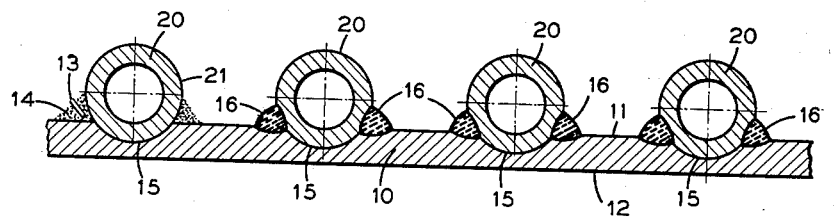
FIG. 1 is a transverse sectional view through a preferred form of multiple tube panel embodying the invention.
Figure 2:
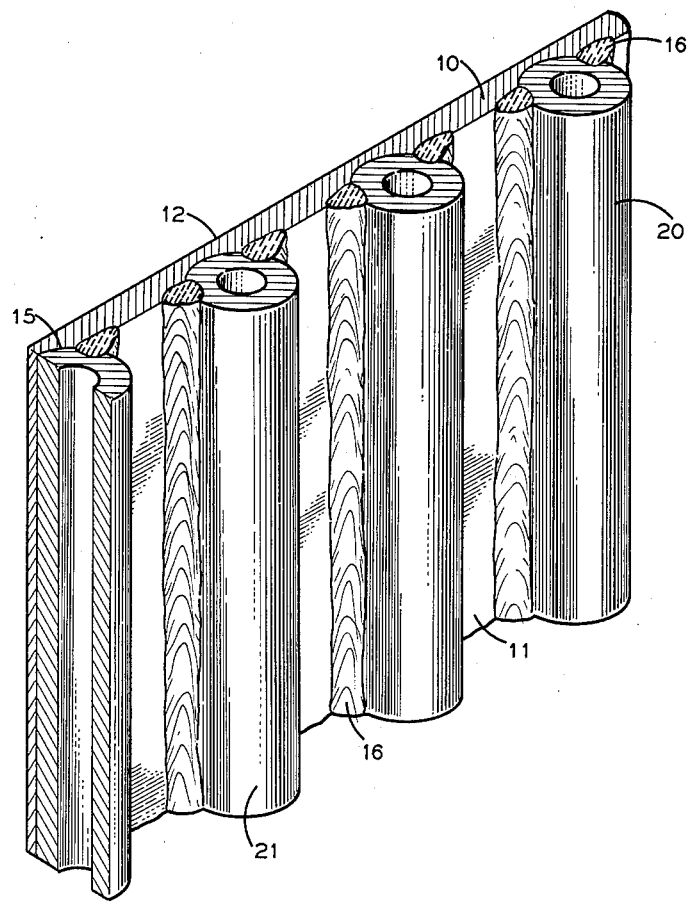
FIG. 2 is a partial perspective view of the panel shown in FIG. 1.

Referring to FIGS. 1 and 2, a metal plate 10, having longitudinal and lateral dimensions of the order of the corresponding final dimensions of the completed multiple tube panel, has a series of parallel, preferably uniformly spaced grooves 15, of arcuate cross-section, formed in one surface 11 by grinding, milling, or any other suitable metal working or removing operation. Grooves 15 are arranged to have contiguously nested therein tubes 20 fusion welded to plate 10.

For this purpose, grooves 15 have the same center-tocenter lateral spacing as is desired for the tubes 20 in the completed panel, and the radius of curvature of the arcuate surfaces of the grooves is equal to the outer radius of tubes 20. The thickness of plate 10 is selected in accordance with the thickness of the panel desired in the inter-tube spaces, and grooves 15 have a depth equal to substantially one-half the thickness of plate 10.

In a particular panel, and by way of example only, tubes 20 may have an outer diameter of 7/8", and a center-to-center spacing of 1½", and plate 10 may be ¼" thick. In this case, the arcuate radius of grooves 15 is 7/16" and the depth of the grooves is 1/8".

In fabricating the panel, plate 10 is positioned with its flat surface 12 on a suitable flat support and tubes 20 are set into each of the grooves in surface engagement with the groove surfaces. This automatically positions and aligns the tubes for welding to plate 10, without the necessity of any special jigging or aligning operations.

Tubes 20 are then weld united to plate 10 by fusion fillet welds deposited in the fillets formed by surface 11 of plate 10 and outer surfaces 21 of tubes 20. A preferred form of welding is submerged arc welding in which an electrode 13 is advanced along the seam, as it is fused and fed toward the work, through a layer 14 of granular mineral welding flux which may be progressively deposited along the seam in advance of the electrode. The welding operation forms fillet welds 16, 16 joining each side of each tube 20 to surface 11, metal being fused from surface 11 and tube 20 during the welding operation to provide a sound, thorough fusion welded fillet joint smoothly merging with surface 11 and the outer surface 21 of each tube 20. The contiguous nesting of tubes 20 in grooves 15 serves to restrain the tubes against lateral bending due to the rapid high heating and cooling characteristic of the fusion welding process. Suitable provision is made to hold each tube firmly pressed downwardly into its groove during the welding of such tube to plate 10.

The overall speed of welding can be greatly increased and the tendency of the tubes to deflect laterally can be substantially eliminated by using the twin electrode system of said Armstrong application to form welds on both sides of a tube at the same time. In such system, each of the two fusible metal electrodes is connected to one terminal of its own independent source of D.C. potential, one electrode being connected in straight polarity relation to the work and the other electrode being connected in reverse polarity relation to the work. The other terminals of the two sources of potential are connected to each other and to plate 10. The two electrodes are conjointly fed to the work and, with the straight polarity electrode fed 40 percent faster than the reverse polarity electrode, the return current in the connection to plate 10 is substantially zero, thus eliminating magnetic blow and variable length ground effects and providing, in effect, a true series arc between the electrodes.

Figure 3:
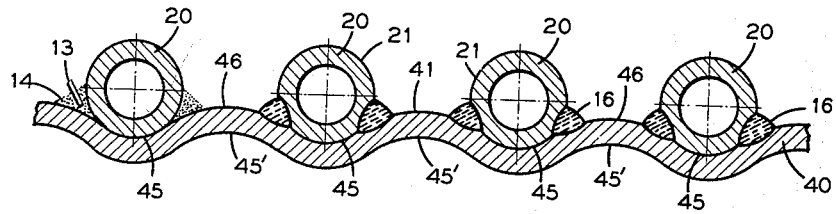
FIGS. 3 and 4 are views, similar to FIG. 1, of alternative forms of panels embodying the invention.

In the embodiment of FIG. 3, a plate 40, having the requisite thickness to provide a given thickness of panel in the intertube spaces, is sinuously curved to provide parallel grooves 45 in its surface 41, these grooves being arcuate in cross-section with the arcuate radius being substantially equal to the outer radius of tubes 20. Grooves 45 have a center-to-center spacing equal to the desired center-to-center spacing of tubes 20 in the completed panel.

The panel is formed in the same manner as previously described, by positioning tubes 20 in grooves 45 and fusion welding each tube to plate 40 as at 16, 16. In this case, the fusion welds are formed between the outer surface 21 of each tube 20 and the convex outer or back surface 46 of the grooves 45' intermediate grooves 45 and facing in the opposite direction from the latter. It will be noted that the sinusoidal curvature of plate 40 is such that surfaces 46 approach but are somewhat spaced from the common diametric or axial plane of tubes 20.

Figure 4:
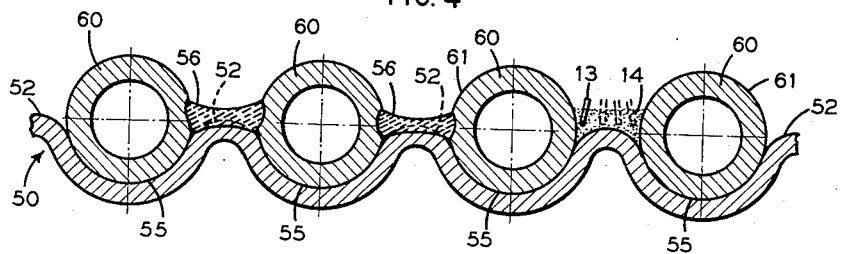

In the embodiment of FIG. 4, a plate 50, having a predetermined thickness less than the desired inter-tube thickness of the completed panel, is curved to provide parallel substantially semi-cylindrical grooves 55 interconnected by reversely directed transition sections or webs 52 whose outer surfaces are substantially tangent to the common diametric or axial plane of grooves 55. Grooves 55 have a radius of curvature equal to the outer radius of tubes 60 and a center-to-center spacing equal to that of tubes 60 in the completed panel.

To form the integrated multiple tube panel, tubes 60 are set into grooves 55 and thereby automatically positioned and aligned for welding. In this instance, the tubes 60 are integrally united to plate 50 by fusion welds 56 extending the full width of the inter-tube spaces and comprising weld metal intimately fused with the outer surfaces 61 of adjacent tubes 60 and with the outer surface of the interposed transition section 52. These welds are made in the same general manner as the welds 16 of FIGS. 1 to 3 by advancing a fusible metal electrode 13 to the work through a bed or layer 14 of granular mineral welding material. Because of the extent of weld deposits 56, these deposits are best made in several passes, with the relative angular direction of electrode 13 being changed for successive passes, as shown toward the right end of FIG. 4.

The depth of deposits 56 is such that these deposits, in combination with transition sections 52, provide the desired inter-tube thickness of the panel. It will be further noted that the outer surfaces of deposits 56 are beyond the common diametric or axial plane of grooves 55 and tubes 60 with reference to transition sections 52.

While specific embodiments of the invention have been shown and described in detail to illustrate the application of the invention principles, it will be understood that the invention may be embodied otherwise without departing from such principles.

What is claimed is:

1. In a wall of a vapor generator subject to heating gases, a shop-assembled integrated multiple tube panel comprising an imperforate metal backing plate formed with a plurality of parallel, longitudinally extending, laterally spaced recesses in a surface thereof adapted in fabrication to receive, support and center the tubes and to provide a backing for weldments; a plurality of relatively elongated metal tubes each lying in one of said recesses and projecting substantially from said surface toward and into the path of and directly exposed to the heating gases; and welds uniting each tube along substantially its entire length to portions of the plate between said recesses to provide uninterrupted metallic paths of thermal conductivity between the tubes and the backing plate and comprising weld deposits along the fillets formed between the external walls of the tubes and such plate surface.

2. In a wall of a vapor generator subject to heating gases, a shop-assembled integrated multiple tube panel comprising an imperforate metal backing plate formed with a plurality of parallel, longitudinally extending recesses of arcuate cross-section in a surface thereof adapted in fabrication to receive, support and center the tubes and to provide a backing for weldments; and a plurality of relatively elongated metal tubes each extending along one of said recesses and projecting substantially from said surface toward and into the path of and directly exposed to the heating gases and weld united along substantially its entire length to said plate at each side of the associated recess to provide uninterrupted metallic paths of thermal conductivity between the tubes and the backing plate.

3. In a wall of a vapor generator subject to heating gases, a shop-assembled integrated multiple tube panel comprising an imperforate metal backing plate formed with a plurality of parallel, longitudinally extending, laterally spaced recesses of arcuate cross-section in a surface thereof adapted in fabrication to receive, support and center the tubes and to provide a backing for weldments; a plurality of relatively elongated metal tubes each lying in one of said recesses and projecting substantially from said surface toward and into the path of and directly exposed to the heating gases; and welds uniting each tube along substantially its entire length to portions of the plate between said recesses to provide uninterrupted metallic paths of thermal conductivity between the tubes and the backing plate and comprising weld deposits along the fillets formed between the external walls of the tubes and such plate surface; the radius of curvature of said recesses being substantially equal to the outer radius of said tubes.

4. In a wall of a vapor generator subject to high temperature heating gases, a shop-assembled integrated multiple tube panel comprising an imperforate metal backing plate formed with a plurality of parallel, longitudinally extending, laterally spaced grooves in one surface thereof adapted in fabrication to receive, support and center the tubes and to provide a backing for weldments, the other surface being substantially flat and said one surface being substantially flat between the grooves; a plurality of relatively elongated metal tubes each lying in one of said grooves and projecting substantially from said one surface toward and into the path of and directly exposed to the heating gases; and a pair of fusion fillet welds uniting the outer surface of each tube along substantially its entire length to the flat portions of said one plate surface on each side of the tube to provide uninterrupted metallic paths of thermal conductivity between the tubes and the backing plate.

5. In a wall of a vapor generator subject to high temperature heating gases, a shop-assembled integrated multiple tube panel, comprising an imperforate metal backing plate deformed sinuously to form a plurality of parallel, longitudinally extending, laterally spaced recesses in the opposite surfaces thereof, with the recesses in one surface being adapted in fabrication to receive, support and center the tubes and to provide a backing for weldments; a plurality of relatively elongated metal tubes each lying in and along one of the recesses in said one surface and projecting substantially from said one surface toward and into the path of and directly exposed to the heating gases; and welds uniting each tube along substantially its entire length to portions of the plate between the recesses in said one surface to provide uninterrupted metallic paths of thermal conductivity between the tubes and the backing plate.

6. In a wall of a vapor generator subject to high temperature heating gases, a shop-assembled integrated multiple tube panel comprising an imperforate metal backing plate deformed to form a plurality of parallel, longitudinally extending, uniformly laterally spaced, semicylindrical recesses in one surface thereof separated by reversely directed relatively narrower transition sections and adapted in fabrication to receive, support and center the tubes and to provide a backing for weldments; a plurality of relatively elongated metal tubes each lying in one of said recesses and projecting substantially from said one surface toward and into the path of and directly exposed to the heating gases; and fusion welds uniting substantially the entire lengths of adjacent tubes to each other and to the transition sections therebetween to provide uninterrupted metallic paths of thermal conductivity between the tubes and the backing plate.

References Cited in the file of this patent

UNITED STATES PATENTS

| | | |
|---|---|---|
| 1,125,113 | Junkers | Jan. 19, 1915 |
| 1,774,150 | Murray | Aug. 26, 1930 |
| 1,841,762 | Samesreuther et al. | Jan. 19, 1932 |

FOREIGN PATENTS

| | | |
|---|---|---|
| 855,293 | France | Feb. 12, 1940 |
| 468,080 | Germany | Nov. 6, 1928 |
| 499,991 | Italy | Nov. 16, 1954 |